Jan. 7, 1958 A. F. BEHNKE 2,819,105
BUSHINGS FOR OSCILLATING JOINTS
Filed Aug. 17, 1955

INVENTOR.
ARNOLD F. BEHNKE
BY

United States Patent Office 2,819,105
Patented Jan. 7, 1958

2,819,105

BUSHINGS FOR OSCILLATING JOINTS

Arnold F. Behnke, Los Angeles, Calif., assignor to Kay-Brunner Steel Products, Inc., a corporation of Delaware Application August 17, 1955, Serial No. 528,874

12 Claims. (Cl. 287—85)

My invention relates to bushings for oscillating joints, and more particularly to bushings including a rubber element used to entirely eliminate lubricant of the bearings of such joints as, for example, the bearings of a joint between a spring shackle and a radius rod of a motor vehicle, or the bearings of a joint between a drawbar and a trailer, the rubber element bearing permanently held under compression to resist relative rotation of the bearings.

It is a purpose of my invention to provide a bushing of this character in which all parts thereof are cast or molded to eliminate machining thereof as well as machining of the bearings of the oscillating joint with which the bushing parts are associated, all to the end of materially reducing the cost of manufacture of both the bushing and the joint.

It is also a purpose of my invention to provide a bushing in which the rubber element thereof comprises a tubular body made in two or more identical sections or units which facilitate assembly and application of the bushing parts to the bearings of an oscillating joint.

It is also a purpose of my invention to provide simple and effective means associated with the bolt that pivotally connects the two parts of an oscillating joint, by which the rubber sections of the bushing element can be placed and maintained under compressive stress, and means responsive to such stress for securing the rubber sections against turning in the respective bearings of the joint, and whereby relative movement of the joint parts whether torsional, lateral, or axial is absorbed by the bushing.

A further purpose of my invention is the provision of a bushing of the above described construction in combination with an oscillating joint, the joint and the bushing having simple and effective means coacting to center the rubber sections of the bushing element longitudinally in the bearings of the joint so that they will function as intended.

I will describe only two forms of bushings, each embodying my invention, in association with two forms of oscillating joints, parts of which include my invention, and will then point out the novel features thereof in claims.

Figures 1, 2:
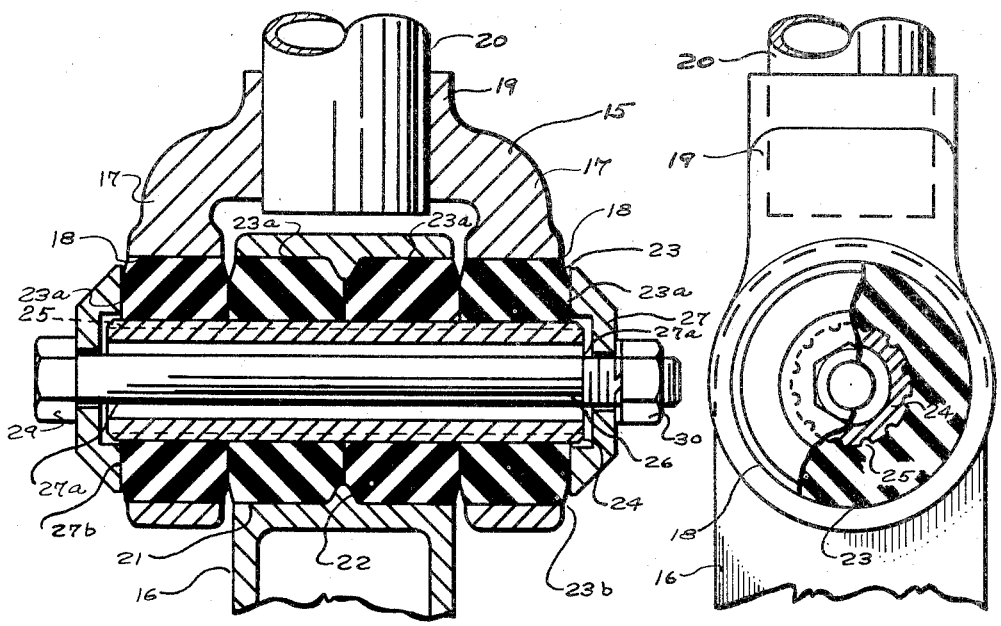
Fig. 1 is a view showing in horizontal section one form of bushing associated with one form of oscillating joint.
Fig. 2 is a side elevational view of the bushing and joint shown in Fig. 1 with parts of the bushing broken away and another part in section.

Referring more particularly to the drawings and to the form of oscillating joint shown in Figs. 1 and 2, it comprises parts 15 and 16 both constructed of cast metal, the part 15 having spaced arms 17 formed with spaced and alined bearings 18, with a sleeve 19 between the arms in which one end of a drawbar 20 is fixed.

The joint part 16 is a bracket rigid to the front end of a trailer (not shown), and having its free end formed with a bearing 21 received between the bearings 18. The bearing 21 is formed, medially of its ends, with an internal annular bead or rib 22 which, in the present instance, is of V-shape in cross section.

The bushing structure shown in Figs. 1 and 2, comprises a bushing element 23 constructed of flexible rubber and of tube form, but divided longitudinally into four sections or units 23a arranged side-by-side in the bearings 18 and 21, two of the sections contained in the bearing 21, and the other two in the bearings 18.

The tube sections 23a are identical in form and have their outer peripheral edges chamfered as at 23b, or otherwise shaped so that those two sections contained in the bearing 21 will form at their confronting edges an annular V-shaped groove in which the bead 22 is received. Thus when these two sections are inserted into opposite ends of the bearing the bead and groove walls provide means for automatically centering the sections in the bearing.

Since the edges of all of the sections are chamfered as described, it is immaterial which two sections are selected for the bearing 21, and which side of either section is first inserted thereinto.

The four bushing sections 23a as assembled in the bearings 18 and 21, have a common inside diameter such that a metallic sleeve 24 can be inserted therein to a position in which its ends project beyond the bearings 18. This sleeve 24 is formed on its outer periphery with an annular series of grooves 25 that extend longitudinally from end to end of the sleeve, and which are spaced preferably equi-distantly one from the other circumferentially of the sleeve.

For exerting a compressible stress on the bushing sections 23a, as well as to pivotally connect the joint parts 15 and 16, I employ a bolt 26, the shank 27a of which extends loosely through the sleeve 24. Plates 27 are loosely mounted on the shank 27a, with one plate abutting the bolt head 29 and the other plate abutting the nut 30 as threaded on the shank. The plates 27 are identical in form, and, as shown, each is of washer shape but recessed at its inner side to provide an annular shoulder 27b having a flat side which, in width, corresponds substantially to the thickness of the bushing sections 23a.

In operation, tightening of the bolt 26 by inward screwing of the nut 30 forces the plates 27 toward each other with the result that the rubber bushing sections 23a are placed under compressive stress axially to expand them radially outward against the bearings 18 and 21, and radially inward against the sleeve 24 causing parts of the rubber to be pressed into the grooves 25. As a consequence, relative movement between the drawbar 20 and the bracket 16 whether torsional, lateral, or axial, is yieldingly absorbed by the bushing sections, and the capacity of such sections to accomplish this absorption is in direct proportion to the compressive stress under which they are maintained.

Figures 3, 4:
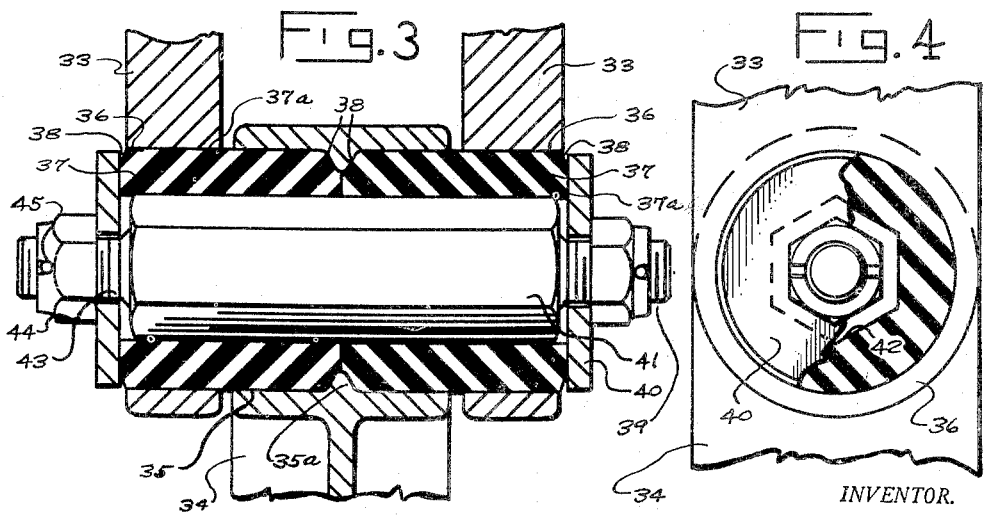
Fig. 3 is a view similar to Fig. 1 showing the other form of bushing in association with the other form of joint.
Fig. 4 is an end elevational view of Fig. 3 with one of the end plates partly broken away.

Referring now to Figs. 3 and 4, another form of bushing is illustrated and as applied to an oscillating joint between the hanger arms 33 of a spring shackle, and radius rod 34, the bearing 35 of the rod being between the bearings 36 of the arms and formed interiorly with an annular V-shaped rib or bead 35a.

In this form of bushing, the bushing element 37 consists of two flexible rubber sections or units 37a, instead of four as in the first form, and similarly, the outer peripheral end edges are chamfered as at 38. Each bushing section 37a is of a length slightly exceeding the combined width of one of the bearings 36 and half of the bearing 35. Thus when the two sections are inserted into the bearings 35 and 36, their confronting edges 38 form a groove in which the rib 35a is received to center the sections longitudinally in the bearing 35.

To pivotally connect the radius rod 34 to the hanger arms 33, as well as to provide means for placing the bushing element 37 under compressive stress, a through-bolt 39 is employed with plates 40 thereon.

The bolt 39 has a shank 41 which has a non-circular portion to provide a plurality of facets 42 coextensive in length therewith, and reduced ends 43 on which castellated nuts 44 are threaded and locked in adjusted position by pins 45. On the ends 43 the plates 40 are loosely mounted, such plates being in washer form and of a diameter to have bearing contact with the outer ends of the units 37a.

As the bolt 39 is associated with the bushing element 37, the non-circular shank portion extends through the units 37a so that the facets 42, because of their angular relation, provide projections to resist relative rotation of the units and the bolt.

In operation of this form of bushing, adjustment of the nuts 44 inwardly on the bolt ends 43 forces the plates 40 toward each other with the result that the bushing sections 37a are placed under compressive stress axially to expand them radially outward against the bearings 35 and 36, and radially inward against the facets 42 causing parts of the rubber to be pressed against the facets. As a consequence, relative movement between the arms 33 and the bracket 34 whether torsional, lateral, or axial, is yieldingly absorbed by the bushing units. Manifestly, the absorption capacity of the units is in direct proportion to the compressive stress under which they are maintained by adjustment of the nuts.

Although I have herein shown and described only two forms of bushings for oscillating joints, each embodying my invention, it is to be understood that various changes and modifications may be made without departing from the spirit of the invention and the spirit and scope of the appended claims.

What I claim is:

1. In a bushing for oscillating joints, a flexible rubber body composed of ring-shaped units; and a rigid sleeve on which said units are directly mounted in side-by-side relation, said sleeve having recesses in its outer peripheral surface into which parts of said units are adapted to be extended when said body is compressed axially.

2. In a bushing for oscillating joints, a flexible rubber body composed of ring-shaped units; and a rigid sleeve on which said units are directly mounted in side-by-side relation, said sleeve having grooves longitudinally in its outer peripheral surface into which parts of said units are adapted to be extended when said body is compressed axially.

3. A bushing for an oscillating joint of the type having one part with two spaced and alined bearings, another part with a single bearing between said two bearings, and a bolt extending through all of the bearings and pivotally connecting said parts, the bushing including: a flexible rubber and tubular body composed of a plurality of individual ring-shaped units certain of which are side-by-side within the bearings of said one part and the other of which are side-by-side in the bearing of said other part; a metal sleeve within said body having grooves longitudinally in its outer periphery, and through which the bolt extends; and end plates mounted on the bolt ends and having portions bearing against the outer sides of the outermost units of said body.

4. A bushing as embodied in claim 3, wherein the units have chamfered outer peripheral edges, and a rib is formed on the inner periphery of said single bearing which is received in the groove formed by confronting edges of those units within said single bearing.

5. In combination: an oscillating joint of the type having one part with two spaced and alined bearings, another part with a single bearing between said two bearings, and a bolt extending through all of the bearings and pivotally connecting said parts, the bolt having a multi-faceted shank with reduced ends, and nuts on said ends; a bushing comprising a flexible rubber and tubular body composed of two identical ring-shaped units through which said bolt shank extends; and plates on said bolt ends adjustable by the nuts to axially compress said body.

6. A combination as embodied in claim 5, wherein the confronting ends of said units at their outer peripheral edges are chamfered to form an intervening annular groove, and an annular rib is formed on the inner side of the single bearing and received in said groove.

7. In a bushing for an oscillating joint; a flexible rubber body composed of a plurality of units adapted to be arranged in side-by-side relation in the bearings of said joint; a bolt having a multi-faceted shank on which said units are fitted, the bolt providing the pivot for said joint and having nuts on its ends; and plates on the bolt ends adjustable by nuts to axially compress said body and as a result to expand the units radially outward against the bearings and radially inward against the bolt shank.

8. In a bushing for oscillating joints, a metallic inner tube; a tube of flexible rubber telescoped over the inner tube and divided transversely into sections, said inner tube having grooves longitudinally therein at spaced intervals circumferentially thereof; a bolt extending freely through said inner tube; and means on the bolt engaging the ends of the rubber tube for compressing the latter through longitudinal adjustment of the bolt in said inner tube, so as to force parts of the rubber tube into said grooves.

9. In a bushing for oscillating joints, a metallic inner tube; a tube of flexible rubber telescoped over the inner tube, said inner tube having grooves longitudinally therein at spaced intervals circumferentially thereof; a bolt extending freely through said inner tube; and means on the bolt engaging the ends of said tube for compressing the latter through longitudinal adjustment of the bolt in said inner tube, so as to force parts of the rubber tube into said grooves.

10. In a bushing for oscillating joints; a metallic inner tube; a tube of flexible rubber telescoped over the inner tube and divided transversely into sections, and with the outer peripheral edges of those two sections at the center of the tube chamfered at their confronting ends to form a V-shaped groove, said inner tube having in its outer periphery grooves longitudinally therein at spaced intervals circumferentially thereof; a bolt extending freely through said inner tube; and means on the bolt engaging the ends of the rubber tube for compressing the latter so as to force parts thereof radially into said grooves.

11. In a bushing for oscillating joints: a metallic and non-deformable member of non-circular form in cross-section; a tubular body of elastic deformable material surrounding said member; and means engaging the outer ends of said body for placing it under compressive stress such as to cause radial expansion of said body against said member.

12. In a joint having two parts with a bolt pivotally connecting the two for oscillating movement; a bushing comprising a tube of flexible rubber divided transversely into sections which are contained within said parts and around the bolt, means at the ends of the bolt for placing and maintaining the sections under compressive stress, and means on the bolt positioned within the sections for resisting rotation of the sections relative to the joint parts and the bolt resultant of the sections being under compressive stress.

References Cited in the file of this patent
UNITED STATES PATENTS

| | | |
|---|---|---|
| 1,835,575 | Sanders et al. | Dec. 8, 1931 |
| 2,366,860 | Kraft | Jan. 9, 1945 |
| 2,416,243 | Thiry | Feb. 18, 1947 |